US011294450B2

(12) United States Patent
Kirisken

(10) Patent No.: US 11,294,450 B2
(45) Date of Patent: Apr. 5, 2022

(54) METHOD AND SYSTEM FOR VR INTERACTION

(71) Applicant: VESTEL ELEKTRONIK SANAYI VE TICARET A.S., Manisa (TR)

(72) Inventor: Barbaros Kirisken, Manisa (TR)

(73) Assignee: VESTEL ELEKTRONIK SANAYI VE TICARET A.S., Manisa (TR)

(*) Notice: Subject to any disclaimer, the term of this patent is extended or adjusted under 35 U.S.C. 154(b) by 0 days.

(21) Appl. No.: 16/498,772

(22) PCT Filed: Mar. 29, 2017

(86) PCT No.: PCT/EP2017/057417
§ 371 (c)(1),
(2) Date: Sep. 27, 2019

(87) PCT Pub. No.: WO2018/177521
PCT Pub. Date: Oct. 14, 2018

(65) Prior Publication Data
US 2021/0116989 A1 Apr. 22, 2021

(51) Int. Cl.
G06F 3/01 (2006.01)
G02B 5/08 (2006.01)
(Continued)

(52) U.S. Cl.
CPC .............. G06F 3/011 (2013.01); G02B 5/08 (2013.01); G02B 27/0101 (2013.01);
(Continued)

(58) Field of Classification Search
CPC .......... G06F 3/011; G06F 3/017; G06F 3/012; G06F 3/013; G06F 3/014; G02B 5/08;
(Continued)

(56) References Cited

U.S. PATENT DOCUMENTS 8,482,527 B1 7/2013 Kim
10,593,088 B2 3/2020 Yarosh et al.
(Continued)

FOREIGN PATENT DOCUMENTS

EP 2 955 610 A1 12/2015
JP 2017504277 A 2/2017
(Continued)

OTHER PUBLICATIONS

Japanese Office Action dated Mar. 4, 2021, (with English Machine Translation), Application No. 2019-553466, 12 Pages.
(Continued)

Primary Examiner — Antonio A Caschera
(74) Attorney, Agent, or Firm — Brooks Kushman P.C.

(57) ABSTRACT

A method for providing data representing body parts of a person comprises at least: providing a head mounted display unit that is arranged at a head of the person, wherein the head mounted display unit has a defined screen section which is arrangeable in front of at least one eye of the person, wherein visual information is outputtable in the defined screen section for displaying the visual information to the at least one eye of the person, providing a camera means for capturing visual information in front of the person, wherein the camera means is part of the head mounted display unit or attached thereto, providing a mirror for mirroring the person while wearing the head mounted display unit, capturing the mirrored visual information with the camera means, processing the mirrored visual information by means of a processing unit, outputting the processed visual information to the person.

12 Claims, 4 Drawing Sheets

(51) Int. Cl.
  *G02B 27/01* (2006.01)
  *G06T 19/00* (2011.01)
(52) U.S. Cl.
  CPC ......... *G02B 27/0172* (2013.01); *G06F 3/017* (2013.01); *G06T 19/006* (2013.01); *G02B 2027/0138* (2013.01)
(58) Field of Classification Search
  CPC ............ G02B 27/0101; G02B 27/0172; G02B 2027/0138; G06T 19/006; H04N 13/332; H04N 13/344
  See application file for complete search history.

(56) References Cited

U.S. PATENT DOCUMENTS

| | | | |
|---|---|---|---|
| 2014/0078043 A1 | 3/2014 | Kim | |
| 2014/0078176 A1 | 3/2014 | Kim et al. | |
| 2014/0184724 A1 | 7/2014 | Cho | |
| 2015/0002475 A1* | 1/2015 | Tiao | G06F 3/017 345/175 |
| 2015/0123991 A1* | 5/2015 | Yarosh | G02B 27/017 345/629 |
| 2015/0364113 A1 | 12/2015 | Ahn et al. | |
| 2016/0171675 A1* | 6/2016 | Tseng | G06F 3/0383 345/8 |
| 2016/0219165 A1 | 7/2016 | Iezaki | |
| 2016/0378176 A1* | 12/2016 | Shiu | G06F 3/011 345/633 |

FOREIGN PATENT DOCUMENTS

| | | |
|---|---|---|
| KR | 20140086268 A | 7/2014 |
| KR | 20150054825 A | 5/2015 |
| KR | 20150142282 A | 12/2015 |
| WO | 2013145147 A1 | 10/2013 |
| WO | 2015/066308 A1 | 5/2015 |

OTHER PUBLICATIONS

PCT International Search Report & Written Opinion dated Sep. 6, 2017, Application No. PCT/EP2017/057417, Applicant Vestel Elektronik Sanayi VE Ticaret A.S., 18 Pages.
First Office Action for Korean Patent Application No. 10-2019-7029184, dated Oct. 28, 2021, 5 Pages.

* cited by examiner

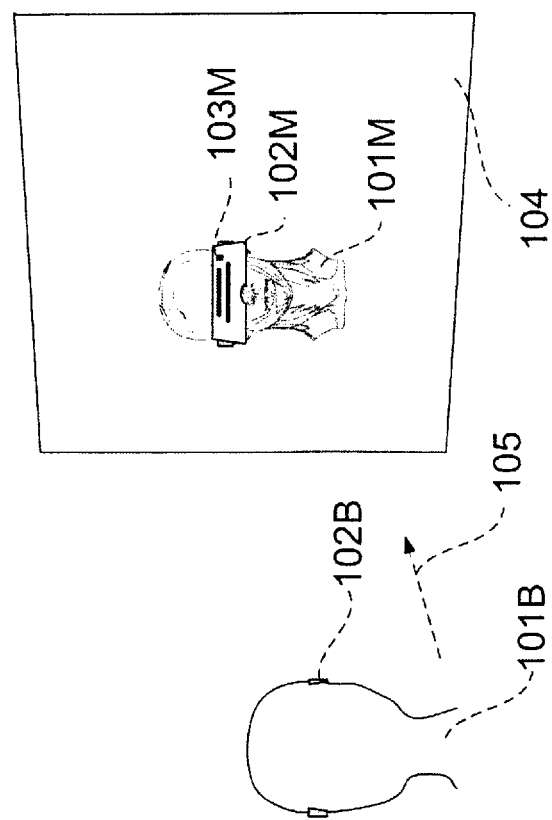
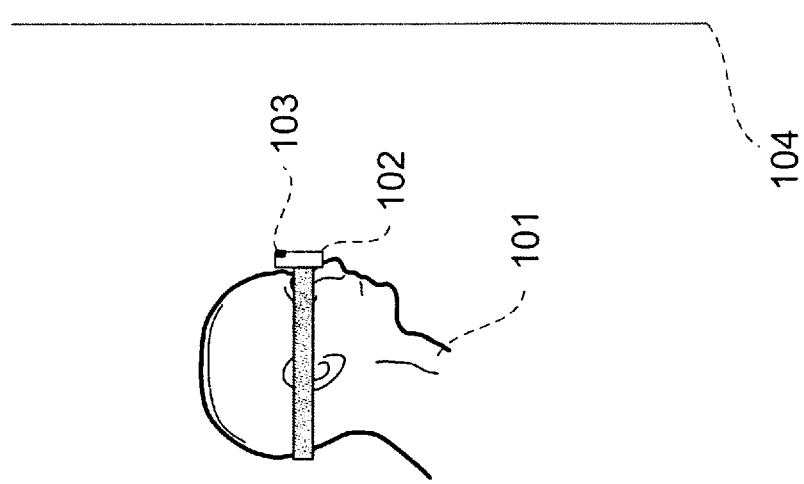
Fig.1B
Fig.1A

METHOD AND SYSTEM FOR VR INTERACTION

CROSS-REFERENCE TO RELATED APPLICATION

This application is the U.S. national phase of PCT Application No. PCT/EP2017/057417 filed on Mar. 29, 2017, the disclosure of which is incorporated in its entirety by reference herein.

TECHNICAL FIELD

The present disclosure refers to a method for providing data representing body parts of a person, to a computer program product for executing such a method and to a communication system for enabling an interaction, in particular a communication, between at least two persons.

BACKGROUND

Virtual reality (VR), in particular augmented reality (AR) and mixed reality (MR), comprises fields of technologies which are evolving rapidly. Due to such technologies, new possibilities appear for gaming, communication and industry.

Capturing hand motions during VR applications requires further external camera devices, since VR devices are attached to the head of the user and thus not focused onto body parts like arms, hands, legs or feet.

Rear and front camera usage of a smartphone is not possible while the smartphone is used inside VR glass. It is only possible to use rear camera (main camera) to capture environment such as mixed reality applications, but it is not possible to use rear (main) camera and/or front camera in applications such as video-conference or videotelephony or videophone or telepresence or virtual space or transferring your real-time image to virtual environment. Such applications are only possible with external camera, which require external components and which are not useful for a totally mobile environment.

SUMMARY

It is therefore an object of the present disclosure to provide a method for operating an advanced VR system and to provide an advanced VR interaction system for enabling interactions between at least two persons.

The before mentioned object is solved by a method for providing data representing body parts of a person. The method preferably comprises at least the steps: providing a head mounted display unit, wherein the head mounted display unit is arranged at a head of said person, wherein the head mounted display unit has a defined screen section which is arrangeable in front of at least one eye of said person, wherein visual information is outputtable in the defined section for displaying the visual information to the at least one eye of said person, providing a camera means for capturing visual information in front of said person, wherein said camera means is part of the head mounted display unit or attached thereto, providing a mirror for mirroring said person while wearing the head mounted display unit, capturing the mirrored visual information with the camera means, processing the mirrored visual information by means of a processing unit. The processed visual information are preferably outputted to one or further users or outputted as data for controlling VR objects, avatars and/or settings.

Thus, the present disclosure consists of an VR glass which preferably uses a smartphone as a screen and preferably comprises a hole at the back cover where rear (main) camera is left open. When user wears a head mounted display, such as VR glass goes in front of a mirror, it flips the image and gives stable view of user even in case user moves the head position.

This solution is beneficial since all electric devices can be mounted to or can be part of the head mounted display unit. Thus, no further camera arranged somewhere in a distance to the respective user is required. Furthermore, mirrors are a very common object present in nearly every house hold. Therefore, the present infrastructure of households and companies can be used to ease the user experience.

Further preferred embodiments are described in the following parts of the description and/or are subject-matter of the dependent claims.

The processing unit rotates the captured visual information according to a further preferred embodiment of the present disclosure before outputting. A rotation respectively flipping preferably takes place, in particularly in a rotating angle of 180°, to bring the mirror-inverted visual information into a non-mirror-inverted version.

According to a further preferred embodiment of the present disclosure the processing unit determines at least one body part, in particularly a hand, of said person in the captured visual information, wherein movements or gestures of said body part are linked with commands for operating the processing unit and/or for modifying the visual information. This embodiment is beneficial since the respective body part can replace a controller device, thus the overall system requires less hardware.

The processing unit determines according to a further preferred embodiment of the present disclosure at least two body parts, in particularly two hands, of said person in the captured visual information, wherein movements or gestures of said body parts are linked with commands for operating the processing unit and/or for modifying the visual information. This embodiment is beneficial since two body parts can be moved relatively to each other, thus more commands can be setup.

The processing unit provides respectively processes according to a further preferred embodiment of the present disclosure at least one virtual object, wherein the virtual object is displayed in an overlaying manner as part of the outputted visual information and wherein the virtual object is modified in dependency of movements of the determined body part. This embodiment is beneficial since the virtual object can be rotated and/or its size can be changed and/or its shape can be changed, etc.

The processing unit provides according to a further preferred embodiment of the present disclosure a virtual environment, wherein said virtual environment is displayed to said person, wherein at least one virtual object and/or the virtual environment is modified in dependency of movements of the determined body part. This solution is beneficial since the virtual environment can be a game environment, in particular for first-person shooter games. The virtual object can be a gun or an avatar. It is further conceivable that a plurality of virtual objects are present.

According to a further preferred embodiment of the present disclosure a screen unit, in particular a smartphone or tablet pc, is arranged in the defined section for displaying the visual information to the at least one eye and preferably both eyes of said person, wherein a screen of the screen unit, in particularly smartphone or tablet pc, faces the eye, in particularly both eyes, of the user and wherein a backside camera of the smartphone acts as the camera means. The screen side of the screen unit defines a front side and the backside is on an opposing side of the screen unit. Thus, the head mounted display unit preferably comprises a frame means for holding a screen unit, in particularly a smartphone or tablet pc. The screen unit can be arranged in a fixed or detachable manner to the frame means. Wherein the frame means preferably provides positioning elements for positioning of the screen of the screen device in the defined screen section.

The processing unit processes the captured visual information in a predefined manner, in particular rotating the outputted visual information, in case mirrored visual information is determined.

According to a further preferred embodiment of the present disclosure an adjustment screen is enabled as video-see-through feature, wherein the mirror is at least partially displayed in the adjustment screen. An evaluation of the captured visual information preferably takes place, wherein the distance between the camera means and the mirror is determined. A signal is preferably outputted in case the distance between camera means and mirror is below a minimal threshold or above a maximum threshold. These embodiments are beneficial since an optimal distance between camera means and mirror can be setup easily.

The present disclosure further refers to a computer program product for executing a herein described method.

The before mentioned object is also solved by a communication respectively interacting system for enabling an interaction, in particularly a communication, between at least two persons. The interacting system comprises at least multiple head mounted display units, wherein the head mounted display units are arranged at the heads of said persons, wherein the head mounted display units have a defined section which is arrangeable in front of at least one eye of the respective person, wherein visual information is outputtable in the defined section for displaying the visual information to the at least one eye of the respective person, camera means for capturing visual information in front of the respective person, wherein each camera means is part of the head mounted display unit or attached thereto, at least one mirror for mirroring the respective person while wearing the head mounted display unit, wherein the respective mirrored visual information is captured with the respective camera means, wherein the mirrored visual information is processed by means of at least one processing unit and wherein the processed visual information is outputted to the respective person and/or the other person. This solution is beneficial since interactions between persons, in particular in VR environment, like MR or AR, can be setup easily, in particularly without external camera means.

The processing unit determines according to a further preferred embodiment of the present disclosure at least one body part, in particularly a hand, of each person in the captured visual information, wherein movements or gestures of said body parts are linked with commands for operating the processing unit and/or for modifying the visual information.

According to a further preferred embodiment of the present disclosure a virtual environment is provided and displayed to each person, wherein modifications caused by one person are displayed to the other person.

Further benefits, goals and features of the present disclosure will be described by the following specification of the attached figures, in which exemplarily components of the disclosure are illustrated. Components of the systems and methods according to the disclosure, which match at least essentially with respect to their function can be marked with the same reference sign, wherein such components do not have to be marked or described multiple times with respect to said figures.

In the following the disclosure is just exemplarily described with respect to the attached figures.

BRIEF DESCRIPTION OF THE DRAWINGS

FIG. 1A shows a person wearing a HMD in front of a mirror;

FIG. 1B shows an image reflected by said mirror;

DETAILED DESCRIPTION

Figure 2:
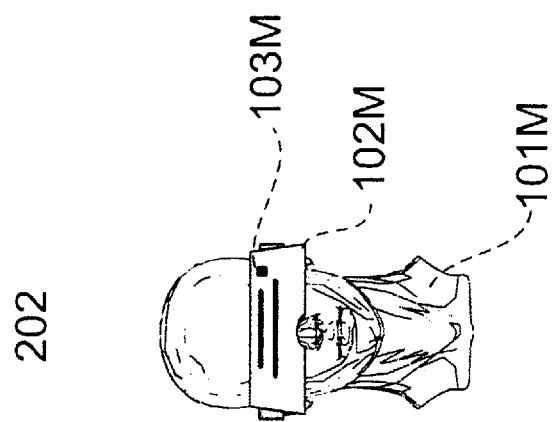
FIG. 2 shows an image of the user and a reflected image of said user.
Figure 2:
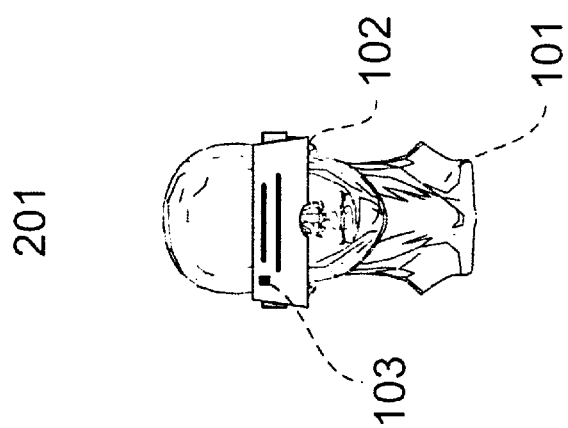

FIG. 1A shows a user respectively person 101 wearing a HMD unit respectively VR glass 102. The HMD unit 102 comprises a camera means 103. Said camera means 103 is preferably arranged in a regular state of usage in such a manner that the environment in front of user 101 can be captured. Reference number 104 indicates a mirror.

FIG. 1B shows a mirror image of user 101, wherein the user is indicated in the reflected image by reference number 101M. The reflected image section representing the HMU unit is indicated by reference number 102M and the reflected image section of the camera means is indicated by reference number 103M. The back side of user 101 is indicated by reference number 101B and reference number 102B indicates parts of the HMD unit which are present on the backside of user 101. Reference number 105 indicates that user 101 is facing mirror 104.

FIG. 2 shows a normal appearance 201 of user and 202 indicates an image of the same user reflected by mirror 104.

Figure 3:
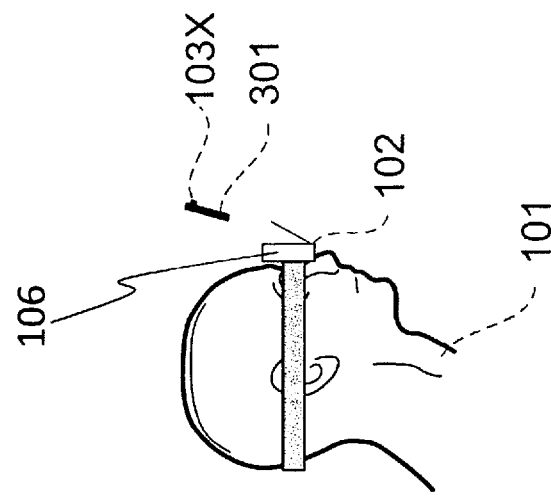
FIG. 3 shows schematically a step of coupling a screen device with a frame means of the HMD unit.

FIG. 3 shows a coupling step of coupling a frame means 106 with a screen device 301, in particularly a smartphone having a rear camera 103X. The screen device 301 is positioned in a predefined screen section part.

Figure 4:
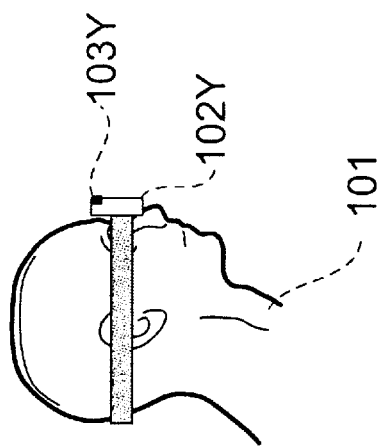
FIG. 4 shows a HMD unit with an embedded camera means.

FIG. 4 shows an alternative embodiment. Contrary to FIG. 3 the camera means 103Y is part of the HMD unit and not part of an external screen device 103X that can be coupled with the HMD unit 102Y. It is further conceivable that a fix respectively not detachable screen device respectively screen is part of the HMD unit 102Y. The camera means 103X is preferably coupled with the screen device, wherein visual information captured by the camera means 103X can be outputted by means of said screen device.

Figure 5:
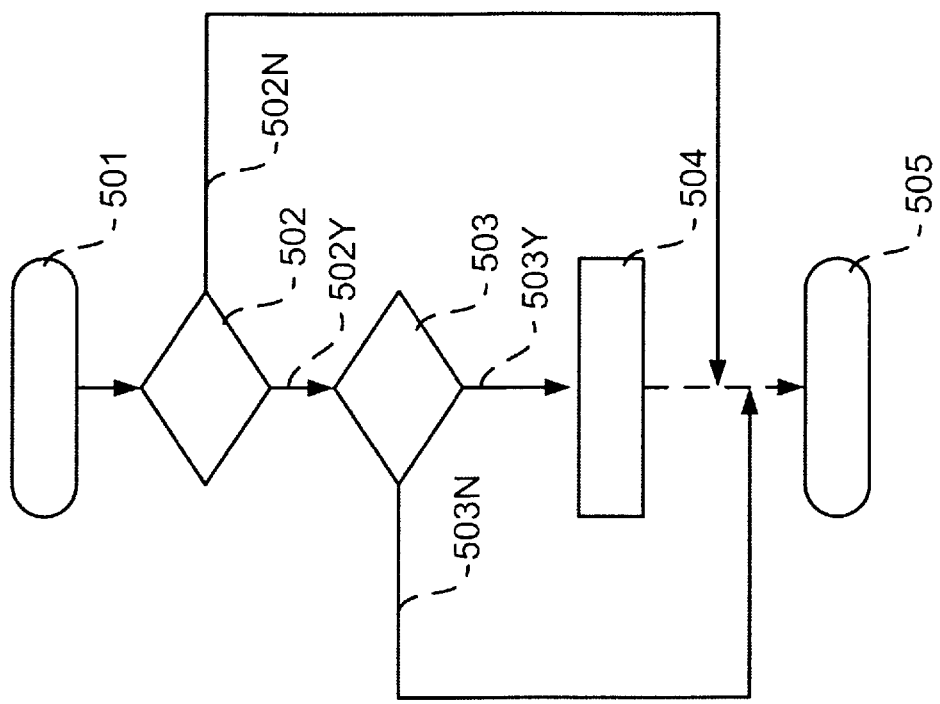
FIG. 5 shows a flowchart representing a routine according to the present disclosure.

FIG. 5 shows a flow chart. According to this flow chart reference number 501 indicates a start of a preferred method. It is checked by the processing device in step 502 if a mirror detection routing is started. In case said routine is started a mirror detection is carried out in step 503. A detected image is processed to compensate mirrored appearance, thus the image data respectively video data representing the captured visual information is preferably flipped. The resulting image data or video data corresponds to image data or video data captured with an external camera. The method ends in step 505. In case check 502 or 503 are negative the method ends.

Thus, the present disclosure refers to a method for providing data representing body parts of a person. This method comprising preferably at least the steps: Providing a head mounted display unit, wherein the head mounted display unit is arranged at a head of said person, wherein the head mounted display unit has a defined section which is arrangeable in front of at least one eye of said person, wherein visual information is outputtable in the defined screen section for displaying the visual information to the at least one eye of said person, providing a camera means for capturing visual information in front of said person, wherein said camera means is part of the head mounted display unit or attached thereto, providing a mirror for mirroring said person while wearing the head mounted display unit, capturing the mirrored visual information with the camera means, processing the mirrored visual information by means of a processing unit, outputting said processed visual information to said person.

Therefore, a specific usage area of disclosure is VR glass with mobile phone, which has a rear camera. But it is also possible to use other devices, such as VR glass with built in screen and additional external camera or any other structure sensor or motion sensor. VR glass can be AR or MR glass or similar or any other HMD or even HUD. An embodiment of the disclosure requires an external mirror, it can be preferably any type of mirror. Not preferred but any other glossy reflective surface is also possible. Mobile phone means any mobile phone or smart phone or phone with capability to be used inside VR glass, most probably with full touch screen.

In particular, the present disclosure refers to a method for providing data representing body parts of a person 101 wherein the method according to the present disclosure comprising at least the steps. Providing a head mounted display unit 102, wherein the head mounted display unit 102 is arranged at a head of said person 101, wherein the head mounted display unit 102 has a defined screen section which is arrangeable in front of at least one eye of said person 101, wherein visual information is outputtable in the defined screen section for displaying the visual information to the at least one eye of said person 101, providing a camera means 103 for capturing visual information in front of said person 101, wherein said camera means 103 is part of the head mounted display unit 102 or attached thereto, providing a mirror 104 for mirroring said person 101 while wearing the head mounted display unit 102, capturing the mirrored visual information with the camera means 103, processing the mirrored visual information by means of a processing unit, outputting said processed visual information to said person 101.

LIST OF REFERENCE NUMBERS

101 User (side view)
102 VR Glass
103 Camera
104 Mirror (Mobile Phone/Smart Phone rear camera)
101B Rear view of user
101M Image of the user which reflected from mirror
102B Rear view of VR Glass
102M Image of the VR Glass which reflected from mirror
103M Image of Camera (Mobile Phone/Smart Phone rear camera) which reflected from mirror
105 User is looking across screen
106 frame means of HMD
201 Normal appearance of user looked across
202 Reflected from mirror
301 Mobile Phone or Smart Phone
103X Rear camera of the phone
103Y Embedded camera
501 Start
502 Is mirror system activated?
502N NO
502Y YES
503 Is mirror detected across the camera?
503N NO
503Y YES
504 Flip image or video and use as external camera
505 End

The invention claimed is:
1. A method for providing data representing body parts of a person,
at least comprising:
providing a head mounted display unit, wherein the head mounted display unit is arrangeable at a head of the person,
wherein the head mounted display unit has a defined screen section which is arrangeable in front of at least one eye of the person,
wherein visual information is outputtable in the defined screen section for displaying the visual information to the at least one eye of the person,
providing a camera means for capturing visual information in front of the person,
wherein the camera means is part of the head mounted display unit or attached thereto,
providing a mirror for mirroring the person while wearing the head mounted display unit,
capturing the mirrored visual information with the camera means,
processing the mirrored visual information by means of a processing unit,
outputting the processed visual information,
wherein an adjustment screen is enabled as video-see-through feature, wherein the mirror is at least partially displayed in the adjustment screen,
wherein an evaluation of the captured visual information takes place, and wherein a distance between the camera means and the mirror is determined,
wherein a signal is outputted in case the distance between the camera means and the mirror is below a minimal threshold or above a maximum threshold,
wherein the adjustment screen and the outputted signal allow an easy setup of the optimal distance between the camera means and the mirror.
2. The method according to claim 1,
wherein the processing unit flips the captured visual information into a non-mirror-inverted configuration before outputting.
3. The method according to claim 2, wherein the processing unit determines a body part of the person in the captured visual information, and wherein movements or gestures of the body part are linked with commands for operating the processing unit or for modifying the visual information or wherein movements or gestures of the body parts are linked with commands for operating the processing unit and for modifying the visual information.
4. The method according to claim 3,
wherein the processing unit provides a virtual object,
wherein the virtual object is displayed in an overlaying manner as part of the outputted visual information and
wherein the virtual object is modified in dependency of movements of the determined body part.

5. The method according to claim 3,
wherein the processing unit provides a virtual environment, wherein the virtual environment is displayed to the person, and wherein at least one virtual object and the virtual environment are/is modified in dependency of movements of the determined body part or wherein at least one virtual object or the virtual environment are/is modified in dependency of movements of the determined body part.

6. The method according to claim 2, wherein the processing unit determines at least two body parts of the person in the captured visual information, and wherein movements or gestures of the at least two body parts are linked with commands for operating the processing unit or for modifying the visual information or wherein movements or gestures of the at least two body parts are linked with commands for operating the processing unit and for modifying the visual information.

7. The method according to claim 1, wherein a smartphone is arranged in the defined section for displaying the visual information to the at least one eye of the person, wherein a screen of the smartphone faces the at least one eye of the person, and wherein a backside camera of the smartphone acts as camera means.

8. The method according to claim 1, wherein the processing unit processes the captured visual information in a predefined manner, in case mirrored visual information is determined.

9. A computer program product for executing a method according to claim 1.

10. A communication system for enabling an interaction between at least two persons, at least comprising:
head mounted display units, wherein the head mounted display units are arranged at heads of the persons,
wherein the head mounted display units each have a defined screen section which is arranged in front of at least one eye of the respective person,
wherein visual information is outputted in the defined section for displaying the visual information to the at least one eye of the respective person,
camera means for capturing visual information in front of the respective person,
wherein each camera means is part of the respective head mounted display unit or attached thereto,
at least one mirror for mirroring the respective person while wearing the head mounted display unit,
wherein the respective mirrored visual information is captured with the respective camera means,
wherein the mirrored visual information is processed by means of at least one processing unit and
wherein the processed visual information is outputted to the respective person or the other person or used as commands for manipulating VR objects, avatars or settings,
wherein an adjustment screen is enabled as video-see-through feature wherein the mirror is at least partially displayed in the adjustment screen,
wherein an evaluation of the captured visual information takes place, and wherein a distance between the camera means and the mirror is determined,
wherein a signal is outputted in case the distance between the camera means and the mirror is below a minimal threshold or above a maximum threshold, wherein the adjustment screen and the outputted signal allow an easy setup of the optimal distance between the camera means and the mirror.

11. A communication system according to claim 10, wherein the processing unit is configured to determine at least one body part of each person in the captured visual information, and wherein movements or gestures of the body parts are linked with commands for operating the processing unit and for modifying the visual information or wherein movements or gestures of the body parts are linked with commands for operating the processing unit or for modifying the visual information.

12. A communication system according to claim 11, wherein a virtual environment is displayed to each person, and wherein modifications caused by one person are displayed to the other person.

* * * * *